United States Patent [19]
Campbell

[11] Patent Number: 6,070,928
[45] Date of Patent: Jun. 6, 2000

[54] MAT WITH INTEGRALLY MOLDED DOOR

[75] Inventor: Michael T. Campbell, Grand Rapids, Mich.

[73] Assignee: Cascade Engineering, Inc., Grand Rapids, Mich.

[21] Appl. No.: 09/007,423

[22] Filed: Jan. 15, 1998

Related U.S. Application Data

[60] Provisional application No. 60/051,640, Jul. 3, 1997, and provisional application No. 60/035,954, Jan. 17, 1997.

[51] Int. Cl.[7] ........................................ H02G 3/28
[52] U.S. Cl. .................. 296/39.3; 174/65 G; 174/152 G
[58] Field of Search .................................. 296/39.3, 208; 169/48, 62; 174/65 G, 70 R, 135, 151, 152 G, 153 G; 248/56; 16/2.1, 2.2

[56] References Cited

U.S. PATENT DOCUMENTS

| | | | |
|---|---|---|---|
| 1,721,119 | 7/1929 | Houghton | 285/217 |
| 1,945,717 | 2/1934 | Woodall | 180/90 |
| 2,843,419 | 7/1958 | Wilfert | 296/187 |
| 3,508,291 | 4/1970 | Klebe | 15/323 |
| 3,701,560 | 10/1972 | Emmerson | 296/154 |
| 3,889,909 | 6/1975 | Koscik | 284/56 |
| 4,047,572 | 9/1977 | Stary et al. | 169/62 |
| 4,083,595 | 4/1978 | Maier | 296/39 A |
| 4,730,363 | 3/1988 | Asbaghi | 16/2 |
| 4,855,533 | 8/1989 | Meyer Swantee | 174/35 R |
| 5,421,127 | 6/1995 | Stefly | 52/1 |
| 5,511,622 | 4/1996 | Thompson | 169/70 |
| 5,709,309 | 1/1998 | Gallagher et al. | 220/229 |
| 5,806,139 | 9/1998 | Anderson et al. | 16/2.1 |
| 5,824,974 | 10/1998 | Campbell | 181/290 |
| 5,908,180 | 6/1999 | Daoud | 248/56 |

FOREIGN PATENT DOCUMENTS

| | | | |
|---|---|---|---|
| 755095 | 5/1943 | Germany | 174/135 |
| 57-171164 | 10/1982 | Japan | 174/153 G |

Primary Examiner—Joseph D. Pape
Assistant Examiner—Paul Chenevert
Attorney, Agent, or Firm—Rader, Fishman, Grauer & Mc Garry, An office of Rader, Fishman & Grauer PLLC

[57] ABSTRACT

A dash mat for blocking the transfer of sound from the vehicle engine compartment, through the firewall, and into the passenger compartment. The dash mat comprising a planar sheet having a pair of opposed doors aligned with an opening in the firewall through which passes a vehicle accessory. The doors move between an open position, where the vehicle accessory can be passed through, and a closed position, where the doors seal the vehicle accessory relative to the planar sheet.

21 Claims, 4 Drawing Sheets

MAT WITH INTEGRALLY MOLDED DOOR

CROSS REFERENCE

This invention claims the benefit of U.S. Provisional Application Ser. No. 60/051,640, filed Jul. 3, 1997 and U.S. Provisional Application Ser. No. 60/035,954 filed Jan. 7, 1997.

BACKGROUND OF THE INVENTION

1. Field of the Invention

This invention relates to sound barrier mats and, more particularly, to dash mats for vehicles having integrally molded hinged doors for installing vehicle accessories.

2. Description of the Related Art

In most contemporary automobiles, a steel firewall separates the engine compartment from the passenger compartment. To reduce the transmission of sound from the engine compartment through the firewall and into the passenger compartment, a sound barrier mat (otherwise known as a dash mat) is typically molded of an elastomeric material. The dash mat is mounted to and substantially overlies the firewall such that an outer surface of the mat is in contact with a bottom surface of the vehicle carpet and extends beyond the carpet to an upper portion of the firewall behind the instrument panel. The dash mat is typically spaced from the firewall by an absorber layer that is usually constructed of an open cell foam or fiberglass material.

Multiple apertures are formed in the dash mat for receiving a corresponding number of mounting studs that project from the firewall for securing the dash mat thereto. Other apertures in the dash mat are aligned with openings in the firewall for the passage of cable guides, wiring harnesses, steering columns, accessory mounts, and so on. Certain vehicle accessories are typically mounted before dash mat installation while other accessories are mounted thereafter. The installation of a wiring harness that extends through an aperture in the dash mat is normally a difficult task. A typical vehicle wiring harness includes several wires wrapped together to form a cable. One or more of the wires may terminate in an electrical plug that is larger than the diameter of the cable, and several electrical plugs may be provided in a single wiring harness. Since the dash mat is designed to insulate the passenger compartment from the engine compartment, the wiring harness aperture in the dash mat must be sized to fit snugly around the cable. However, since the electrical plugs are larger than the diameter of the cable, it is difficult to install the plugs through the wiring harness aperture without damaging the dash mat, the plugs, or the electrical connection between the wires and plugs. To avoid possible damage, a slit typically extends from an edge of the dash mat to the wiring harness aperture. Although the slit facilitates installation of the wiring harness, the aperture and slit impair the sound reduction qualities of the dash mat.

SUMMARY OF THE INVENTION

The invention is a dash mat for a motor vehicle comprising an engine compartment and a passenger compartment, which are separated by a firewall having at least one opening through which a vehicle accessory can pass. The dash mat blocks the transfer of sound from the engine compartment through the firewall and into the passenger compartment.

The dash mat according to the invention comprises a planar sheet adapted to be mounted to the firewall and has at least one accessory opening that is aligned with an opening in the firewall when the planar sheet is mounted to the firewall. The dash mat further includes at least one door having opposing sides, with one side movably mounted to the planar sheet and the other side having a portion adapted to conform to a portion of the vehicle accessory. The door is movable between an open position, in which the vehicle accessory can pass through the planar sheet, and a closed position, in which the at least one door is adapted to generally conform to a portion of the vehicle accessory to at least partially seal a vehicle accessory relative to the planar sheet.

Preferably, the dash mat comprises a pair of opposing doors movably mounted to the planar sheet for movement between an open position in which the vehicle accessory can pass through the planar sheet and a closed position in which the doors are adapted to generally and snugly encircle the vehicle accessory to seal the vehicle accessory relative to the planar sheet. Each door of the door pair has opposing first and second side edges, each first edge being hingedly mounted to the planar sheet, and each second edge having at least a portion thereof adapted to conform to at least a portion of the vehicle accessory when the doors are closed. Additionally, each door can comprise a collar extending from the second edge of the door and each collar defines the portion of the second edge adapted to conform to at least a portion of the vehicle accessory.

The dash mat according to the invention can also comprise a releasable fastener for securing the two doors together in the closed position. Preferably, the releasable fastener comprises a clip mounted to one door and a hook mounted to the other door and received within the clip when the doors are closed. In one embodiment, the hook is V-shaped having a tip from which extends diverging opposing sides, which terminate in spaced rear edges. The clip is C-shaped with resilient catches that overlie the rear edges of the hook to secure the doors together in the closed position. In a second embodiment, the hook is crescent shaped and the clip is D-shaped, defining an opening in which the crescent shaped hook is received and overlies the straight portion of the D-shaped hook to secure the doors together.

BRIEF DESCRIPTION OF THE DRAWINGS

The invention will now be described with reference to the drawings in which.

DETAILED DESCRIPTION OF THE PREFERRED EMBODIMENTS

Figure 1:
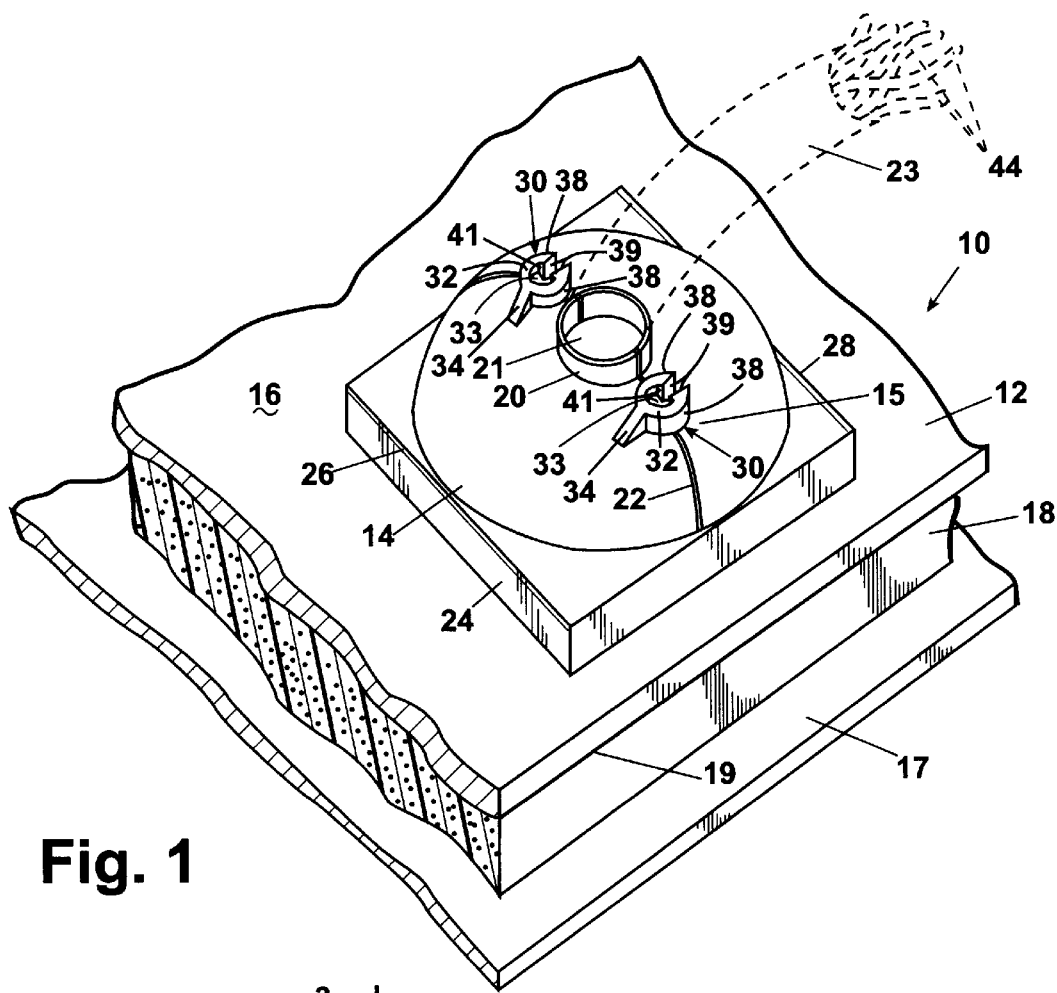
FIG. 1 is a perspective view of a portion of a vehicle dash mat assembly having a pair of integrally molded doors locked in the closed position according to the invention.

Referring now to FIGS. 1–4, a dash mat 10 includes a planar sheet 12 with a pair of integrally molded doors 14, 15 and an absorber layer 18 attached to an inner surface 19 of the planar sheet 12. Preferably, the planar sheet 12 is formed of a filled elastomeric moldable polymer, such as elastomeric polypropylene, for example. The dash mat 10 is attached to the firewall 17 of a vehicle, from the passenger compartment side, and serves as a sound barrier layer to reduce the transmission of sound from the engine compartment through the firewall and into the passenger compartment of a vehicle. An outer surface 16 of the planar sheet 12 typically faces the underside of a vehicle carpet (not shown) and extends past the carpet behind the instrument panel. The inner surface 19 of the planar sheet 12 typically faces the firewall and can include the absorber layer 18 such that the planar sheet 12 is spaced from the firewall a distance equal to the thickness of the absorber layer. Although not shown, the doors 14, 15 can also include an absorber layer.

The doors 14, 15 have a cross-sectional shape that conforms to the shape of the vehicle accessory. As illustrated, the doors 14, 15 are preferably half dome-shaped and form a full dome when the doors abut each other along a seam line 22 in the closed position. A half-collar 20 is integral with and extends upwardly from each door 14, 15. The half-collars 20 form an opening 21 in the planar sheet 12 when the doors are in the closed position. The half-collars 20 and opening 21 are adapted to receive electrical cable 23, as represented by dashed line in FIG. 1, steering column shafts, actuator shafts, etc., depending on the size of the collars and opening and the location on the dash mat. Several pairs of collars with their associated doors can be provided at different locations on the dash mat for accommodating various vehicle accessories.

A spacer wall 24 is integrally molded with the planar sheet 12 and extends, outwardly from the outer surface 16 and inwardly from the inner surface 19 (FIGS. 3 and 4) to form a box-like enclosure. A lower edge 25 of the wall 24 is adapted to abut the firewall 17 when the planar sheet 12 is installed in the vehicle. The doors 14 and 15 are integrally formed with first and second living hinges 26 and 28 at outer opposed edges of the wall 24 so that the doors are spaced from the surface 16 a predetermined distance and rotate with respect to the wall 24. The hinges 26 and 28 are formed by cutting or molding a groove or slot on the outer surface of the wall 24. In this manner, the doors 14 and 15 can rotate outwardly about the living hinge 22 and are prevented from rotating past the closed position when the doors contact each other. The height of the wall 24 can be varied to adjust the spacing between the doors and the surface 16.

Figure 2:
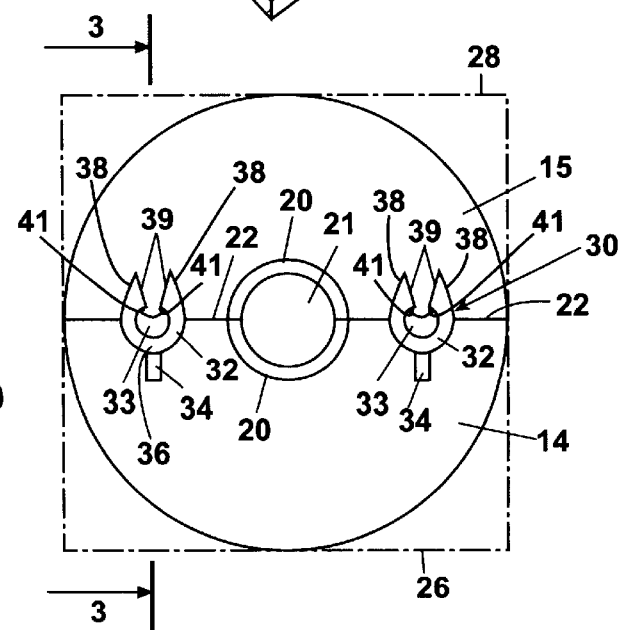
FIG. 2 is a top, plan view of the integrally molded doors of FIG. 1.

A snap fastener assembly 30 projects upwardly from the doors 14, 15 on opposite sides of the half-collars 20. The assembly 30 includes a C-shaped clip 32 that is formed integrally with the door 14 and extends upwardly therefrom and a crescent-shaped hook 33 that is formed integrally with the door 15 and extends upwardly therefrom. A reinforcing rib 34 is formed with a closed rear portion 36 of the clip 32 and the door 14 to resist forces generated when the fastener assembly is opened and closed. The clip 32 includes a pair of spaced catches 38 that project beyond an upper edge 40 (FIG. 3) of the door 14 to engage and substantially surround the hook 33 when the doors are in the closed position. The legs of the C-shaped clip 32 flex sufficiently when the hook 33 is forced between the legs as the doors 14, 15 are closed so that the hook 33 is received in the clip 32 in a snap-fit engagement. Each of the catches 38 has a diverging camming surface 39 which forms an undercut shoulder 41. The camming surfaces 39 ride along the hook 33 to spread the catches as the clips are forced onto the hooks 33 until the undercut shoulders 41 snap over the edges of the hooks 33 as illustrated in FIG. 2. Once snapped onto the hooks 33, the clips 32 are resistant to separation to thereby keep the doors in a closed position. Although a particular fastening arrangement has been described, it is to be understood that other fasteners, either molded with the dash mat and doors, or formed separately, can be used.

Figure 5:
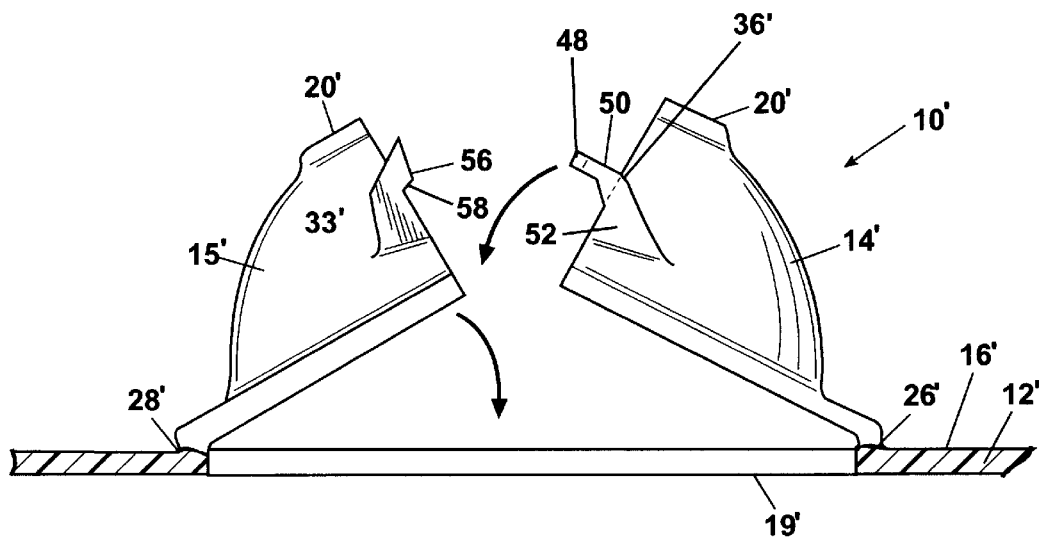
FIG. 5 is a side-elevational view of a second embodiment of the invention showing the integrally molded doors in a partially open position.
Figure 6:
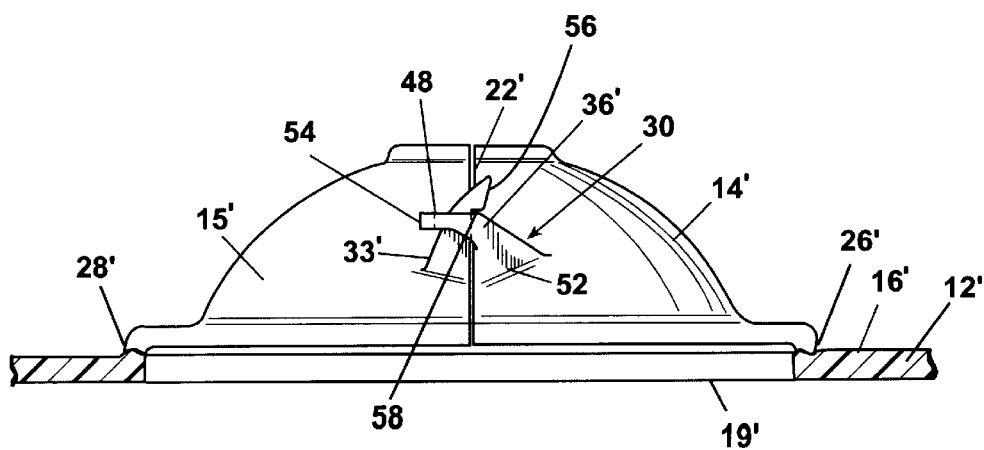
FIG. 6 is a side-elevational view similar to FIG. 5 of the second embodiment of the invention showing the doors in closed and locked positions.
Figure 7:
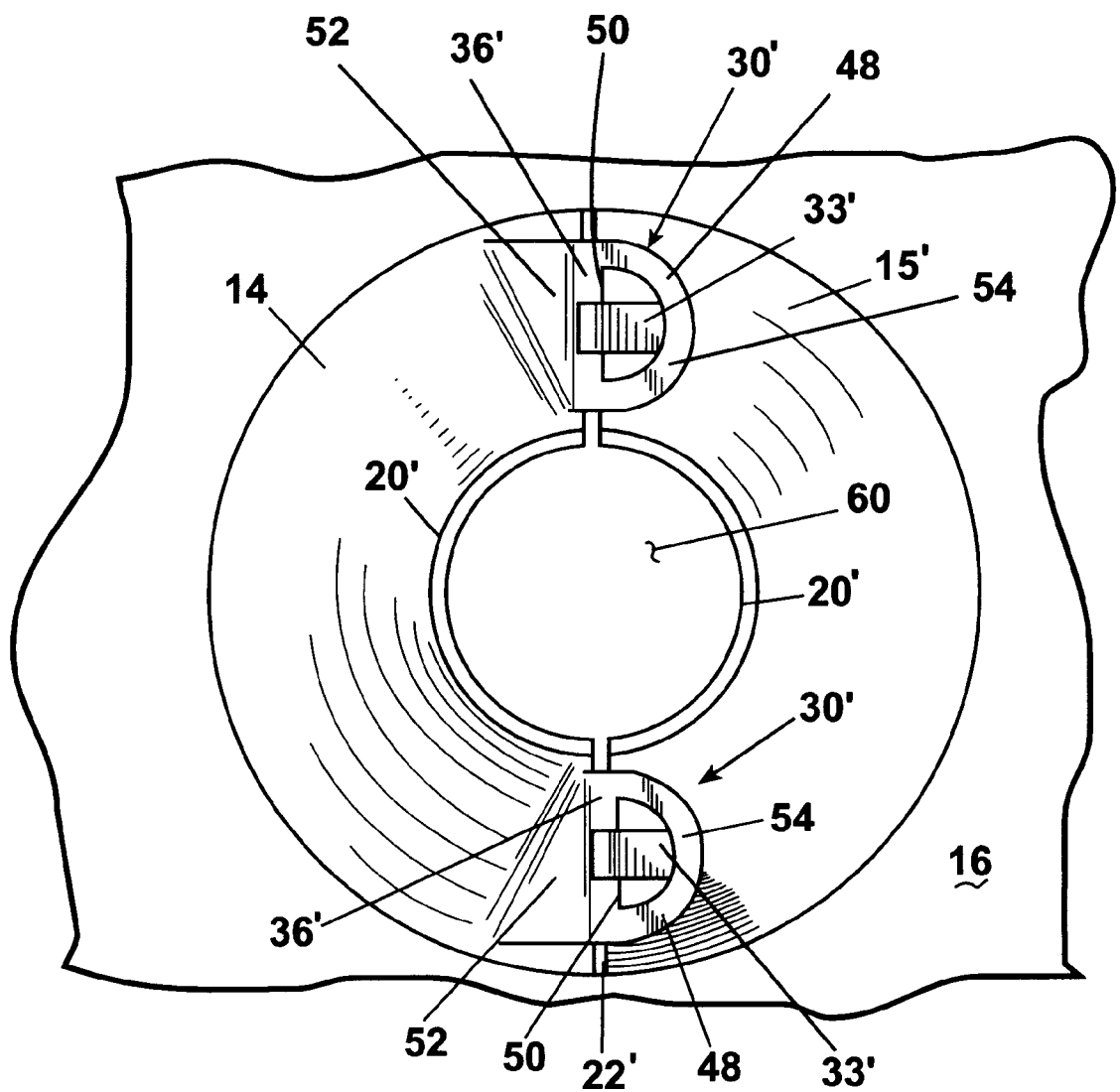
FIG. 7 is a top, plan view of the integrally molded doors of FIG. 5 in a closed and locked position.

Referring now to FIGS. 5–7, which illustrate a second embodiment of a dash mat 10' includes a planar sheet 12' with a pair of integrally molded doors 14', 15'. Preferably, the planar sheet 12' is formed of a filled elastomeric moldable polymer, such as elastomeric polypropylene. The dash mat 10' is attached to the firewall (not shown) of a vehicle from the passenger compartment side and serves as a sound barrier layer to reduce the transmission of sound from the engine compartment through the firewall and into the passenger compartment of a vehicle. An outer surface 16' of the planar sheet 12' typically faces the underside of a vehicle carpet (not shown) and extends past the carpet behind the instrument panel. The inner surface 19' of the planar sheet 12' typically faces the firewall, and can include the absorber layer (not shown) such that the planar sheet 12' is spaced from the firewall a distance equal to the thickness of the absorber layer. Although not shown, the doors 14', 15' can also include an absorber layer.

The doors 14', 15' are preferably half dome-shaped and form a full dome when the doors abut each other along a seam line 22' in the closed position. A half-collar 20' is integral with and extends upwardly from each door 14', 15'. The half-collars 20' form an opening 60 in the planar sheet 12' when the doors are in the closed position as shown in FIG. 7. The half-collars 20' and opening 60 are adapted to receive electrical cable, steering column shafts, actuator shafts, etc., depending on the size of the collars and opening and the location on the dash mat. Several pairs of collars with their associated doors can be provided at different locations on the dash mat for accommodating various vehicle accessories.

The doors 14' and 15' are integrally formed with first and second living hinges 26' and 28' at the outer dash mat surface 16' so that the doors are spaced from the surface 16' a predetermined distance and rotate with respect to the planar sheet 12'. The hinges 26' and 28' are formed by cutting or molding a groove or slot on the planar sheet. In this manner, the doors 14' and 15' can rotate outwardly about the living hinges 26', 28' and are prevented from rotating past the closed position when the doors contact each other.

A snap fastener assembly 30' projects upwardly from the doors 14', 15' on opposite sides of the half-collars 20'. The assembly 30' includes a substantially D-shaped clip 48 that is formed integrally with the door 14' and extends upwardly therefrom and a crescent-shaped hook 33' that is formed integrally with the door 15' and extends upwardly therefrom. A clip support 52 is formed with the door 14' and the closed rear portion 36' of the clip 48 which forms a substantially straight edge 50. The clip support 52 resists forces generated when the fastener assembly is opened and closed. The substantially straight edge 50 of the D-shaped clip 48 catches and engages the hook 33', and the curved portion 54 of the D-shaped clip substantially surrounds the hook when the doors are in the closed position. The fastener assembly 30' flexes sufficiently when the clip 48 is forced over the hook 33' as the doors 14', 15' are closed so that the hook 33' is received in the clip 48 in a snap-fit engagement. Each hook 33' has an inner surface 56 which forms an undercut shoulder 58. The inner surfaces 56 ride along the straight edge 50 of the clip 48 as the clips are forced onto the hooks 33 until the undercut shoulders 58 snap over the rear edges 50 of the clip 48. Once snapped onto the clips 48, the hooks 33' are resistant to separation and thereby keep the doors in a closed position. Although a particular fastening arrangement has been described, it is to be understood that other fasteners, either molded with the dash mat and doors or formed separately, can be used.

Figure 3:
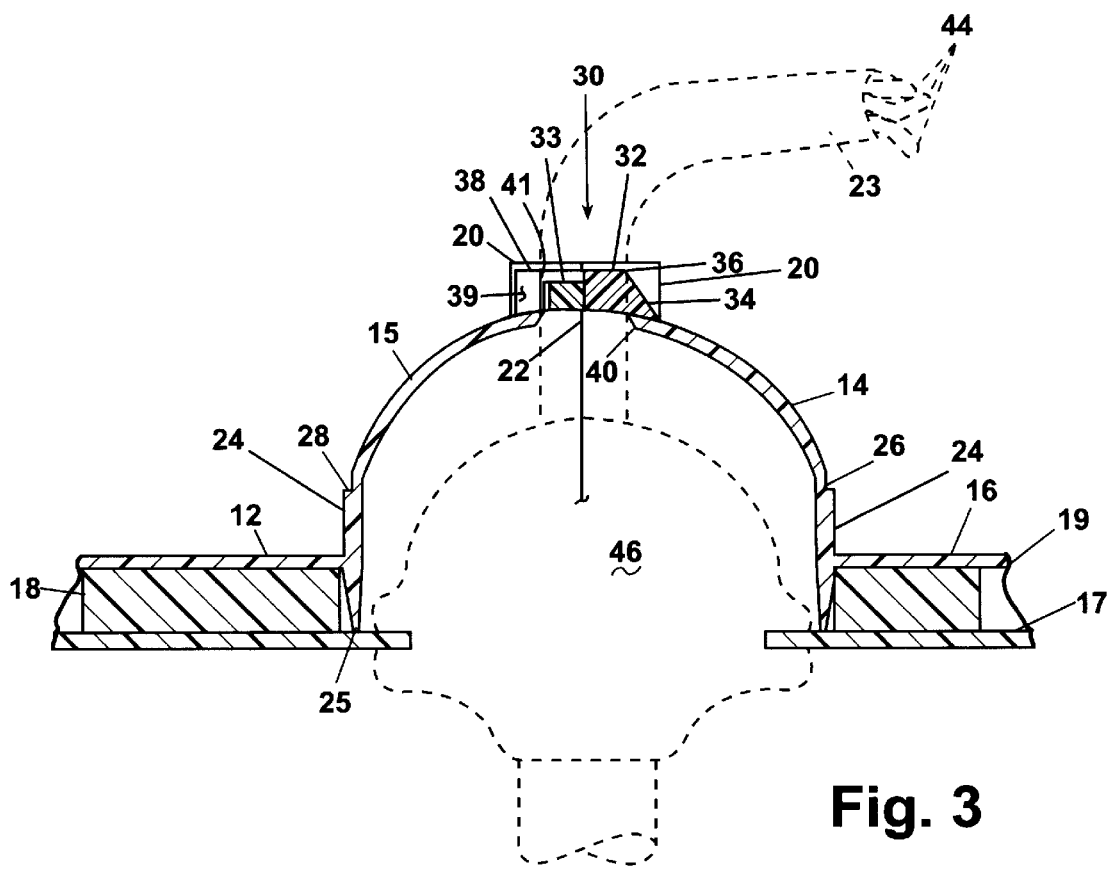
FIG. 3 is a cross-sectional view of a portion of the doors in a partially open position and an integral fastener assembly taken along line 3—3 of FIG. 2.
Figure 4:
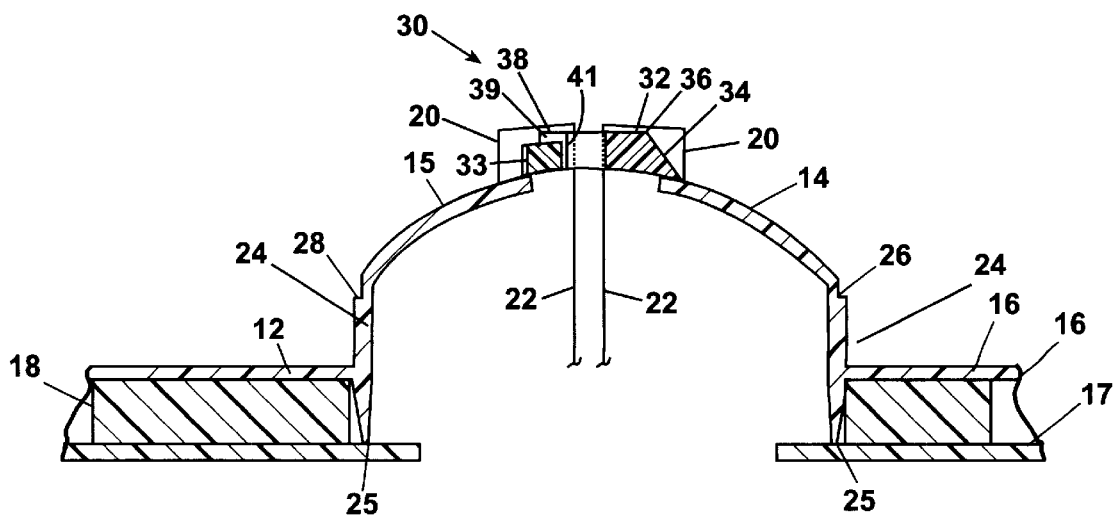
FIG. 4 is a cross-sectional view similar to FIG. 3 with the doors in a closed and locked position.

By way of example, in the first embodiment when it is necessary to route a wiring harness 42 as represented by dashed line in FIG. 3 having a cable 23 comprising several wires 44 electrically connected to one or more plugs 46 through an installed dash mat, a pair of doors 14, 15 with their associated half-collars 20 and opening 21 are provided at the required location on the dash mat. The half-collars 20 and opening 21 are sized to snugly receive the cable 23 when the doors 14, 15 are in the closed position. The doors are opened by applying sufficient force to the fastener assembly 30 and then rotating the doors outward to dislodge the hook from the clip. The plug 44 of the wiring harness, which is typically larger than the diameter of the opening 21 when the doors are closed, is then threaded through the enlarged opening of the dash mat. The plug 44 can then be installed to the firewall 17 in a well-known manner, and the cable 23 can then be positioned in the opening 21 once the plug is clear of the dash mat. The doors are then closed and secured in position through the closure of the hook 33 into the C-shaped clip 32. In the closed position, the half-collars 20 fit snugly around the cable to seal out noise that may be present in the engine compartment.

The same wiring harness installation described above for FIG. 3 applies the second embodiment in FIGS. 5–7, except that the crescent-shaped hook 33' is received within the D-shaped clip 32' to secure the doors together.

Although the above procedure has been described in conjunction with installing a wiring harness, it is to be understood that the same procedure can be used for the installation, access to, and/or removal of other vehicle accessories.

While the invention has been described in connection with a sound barrier layer having an integral door for use with a vehicle firewall, it is to be understood that the invention is not necessarily so limited, and that the invention can be practiced where installation or removal of large items through a small opening in a layer of material is required, or where access behind a layer of material is desired.

Reasonable variation and modification are possible within the spirit of the foregoing specification and drawings without departing from the scope of the invention.

I claim:

1. A dash mat for a motor vehicle comprising an engine compartment and a passenger compartment, which are separated by a firewall having at least one opening through which a vehicle accessory can pass, the dash mat comprising:

a planar sheet for mounting to the firewall to block sound passing from the engine compartment, through the firewall, and into the passenger compartment, and having at least one accessory opening that for alignment with the at least one firewall opening when the planar sheet is mounted to the firewall; and a pair of opposing doors moveably mounted to the planar sheet for movement between an open position, in which the vehicle accessory can pass through the planar sheet, and a closed position, for surrounding the vehicle accessory to seal the vehicle accessory relative to the planar sheet.

2. A dash mat according to claim 1 wherein each door has opposing first and second edges, each first edge being hingedly mounted to the planar sheet for rotation between the open and closed positions, and each second edge having at least a portion thereof adapted to conform to at least a portion of a vehicle accessory when the doors are closed to substantial seal a vehicle accessory relative to the planar sheet.

3. A dash mat according to claim 2 wherein each door comprises a collar extending from the second edge, each collar defining the portion of each second edge adapted to conform to at least a portion of a vehicle accessory.

4. A dash mat according to claim 3 wherein the collars have semi-circular cross sections, defining an opening through which a vehicle accessory can pass when the doors are closed and adapted to seal a vehicle accessory relative to the planar sheet.

5. A dash mat according to claim 4 wherein each door has a cross-sectional shape conforming to a vehicle accessory passing through the doors.

6. A dash mat according to claim 5 wherein the cross-sectional shape of each door is a partial dome.

7. A dash mat according to claim 2 wherein each door includes a living hinge to hingedly connect the first edge to the planar sheet whereby rotation about the living hinge moves the door between the open and closed positions.

8. A dash mat according to claim 7 wherein the living hinge is defined by a reduced thickness portion of the door.

9. A dash mat according to claim 7 wherein the living hinge is integrally molded with the planar sheet and the door.

10. A dash mat according to claim 1 and further comprising a releasable fastener for securing the doors together in the closed position.

11. A dash mat according to claim 1 wherein the planar sheet further comprises an edge extending from a bottom surface of the planar sheet to space the planar sheet from the firewall.

12. A dash mat according to claim 1 wherein there are multiple accessory openings in the planar sheet and corresponding pairs of doors.

13. A dash mat according to claim 1 wherein each door has a cross-sectional shape adapted to conform to the shape of a vehicle accessory.

14. A dash mat for a motor vehicle comprising an engine compartment and a passenger compartment, which are separated by a firewall having at least one opening through which a vehicle accessory can pass, the dash mat comprising:

a planar sheet for mounting to the firewall to block sound passing from the engine compartment, through the firewall, and into the passenger compartment, and having at least one accessory opening that for alignment with the at least one firewall opening when the planar sheet is mounted to the firewall;

a pair of opposing doors moveably mounted to the planar sheet for movement between an open position, in which the vehicle accessory can pass through the planar sheet, and a closed position, for surrounding the vehicle accessory to seal a vehicle accessory relative to the planar sheet; and a releasable fastener comprising a clip mounted to one of said door and a hook mounted to the other of said door and received within the clip when the doors are closed to secure the doors together.

15. A dash mat according to claim 14 wherein the hook is crescent-shaped with a tip from which extends diverging opposing sides, terminating in spaced rear edges and the clip is C-shaped with resilient opposed catches whereby as the hook is received within the clip, the tip of the hook passes between the catches, and the sides of the hook deflect the catches until the spaced rear edges of the hook passes the catches which spring back to their undeflected position and overlying the rear edges of the hook to secure the doors together.

16. A dash mat according to claim 14 wherein the hook is crescent-shaped and the clip is D-shaped, defining an opening in which the crescent-shaped hook is received when the doors are closed and the crescent-shaped hook overlies a straight portion of the D-shaped opening to secure the doors together.

17. A dash mat according to claim 14 wherein a reinforcement rib is provided between the clip and the door.

18. A dash mat according to claim 14 wherein there are multiple sets of clips and hooks.

19. A dash mat for a motor vehicle comprising an engine compartment and a passenger compartment, which are separated by a firewall having at least one opening through which passes a vehicle accessory, the dash mat comprising:

a planar sheet for mounting to the firewall to dampen sound passing from the engine compartment, through the firewall, into the passenger compartment, and having at least one accessory opening which for alignment with the at least one firewall opening when the planar sheet is mounted to the firewall; and at least one door having opposing sides, with one side hingedly mounted to the planar sheet and the other side having a portion adapted to conform to a portion of the vehicle accessory, the at least one door being movable between an open position, in which the vehicle accessory can pass through the planar sheet and a closed position, for conforming to a portion of the vehicle accessory to at least partially seal the vehicle accessory relative to the planar sheet.

20. A dash mat according to claim 19 wherein the at least one door comprises a collar extending from the other side and defining the portion of the other side adapted to conform to at least a portion of the vehicle accessory.

21. A dash mat according to claim 19 wherein the at least one door comprises a living hinge to hingedly connect the one side of the at least one door to the planar sheet.

* * * * *